United States Patent
Ikeda

(10) Patent No.: US 7,802,482 B2
(45) Date of Patent: Sep. 28, 2010

(54) DIAPHRAGM ATTACHING STRUCTURE OF ELECTROSTATIC CAPACITY TYPE PRESSURE GAUGE

(75) Inventor: Toru Ikeda, Kyoto (JP)

(73) Assignee: Horiba Stec Co., Ltd., Kyoto (JP)

( * ) Notice: Subject to any disclaimer, the term of this patent is extended or adjusted under 35 U.S.C. 154(b) by 162 days.

(21) Appl. No.: 11/995,234

(22) PCT Filed: Aug. 2, 2006

(86) PCT No.: PCT/JP2006/315296

§ 371 (c)(1),
(2), (4) Date: Jan. 10, 2008

(87) PCT Pub. No.: WO2007/018088

PCT Pub. Date: Feb. 15, 2007

(65) Prior Publication Data

US 2009/0260447 A1  Oct. 22, 2009

(30) Foreign Application Priority Data

Aug. 10, 2005  (JP) .............................. 2006-231916

(51) Int. Cl.
*G01L 9/12* (2006.01)
(52) U.S. Cl. .......................................... 73/718; 73/715
(58) Field of Classification Search ........... 73/715–728, 73/777
See application file for complete search history.

(56) References Cited

U.S. PATENT DOCUMENTS 4,229,723 A * 10/1980 Tobin ......................... 337/275
4,617,607 A * 10/1986 Park et al. ................. 361/283.4
4,996,627 A *  2/1991 Zias et al. ................. 361/283.4
5,186,055 A *  2/1993 Kovacich et al. .............. 73/727

FOREIGN PATENT DOCUMENTS

| JP | 5-52737    | 7/1993 |
| JP | 07-128170  | 5/1995 |
| JP | 10-052764  | 2/1998 |
| JP | 11-248583  | 9/1999 |

* cited by examiner

*Primary Examiner*—Max Noori

(57) ABSTRACT

The present invention provides a diaphragm attaching structure of an electrostatic capacity type pressure gauge which can achieve an improvement of a measuring precision by inhibiting a poor weld and a heat strain from being generated while restricting an increase of a cost with an easy manufacturing.

The present invention is a diaphragm attaching structure of an electrostatic capacity type pressure gauge in which a diaphragm for receiving a fluid pressure is provided in a tensional manner on one end of a tubular case, and a fixed side electrode for picking up a deflection displacement of the diaphragm as a change of an electric capacity is provided within the tubular case on a side opposite to a pressure receiving surface of the diaphragm, wherein an outer peripheral edge portion of the diaphragm is formed thicker than a center portion thereof, and the thick outer peripheral edge portion is thermally molten to be welded and firmly attached to an end surface portion around the opening on the one end of the tubular case.

15 Claims, 3 Drawing Sheets

DIAPHRAGM ATTACHING STRUCTURE OF ELECTROSTATIC CAPACITY TYPE PRESSURE GAUGE

TECHNICAL FIELD

The present invention relates to a diaphragm attaching structure of an electrostatic capacity type pressure gauge in which a diaphragm for receiving a fluid pressure is provided in a tensional manner on one end of a tubular case, and a fixed side electrode for picking up a deflection displacement of the diaphragm as a change of an electric capacity is provided within the tubular case on a side opposite to a pressure receiving surface of the diaphragm, such as a pressure gauge used as a mass flow sensor in a mass flow controller.

BACKGROUND ART

As this kind of diaphragm of the electrostatic capacity type pressure gauge, in order to achieve a pressure measurement having a high precision, there has been generally employed a thin film having a uniform thickness equal to or less than 0.1 mm as a whole in a range between 25 and 125 μm. Further, a diameter thereof is very small such as about 1 inch (25.4 mm).

In order to attach the diaphragm made of the thin film and having the small diameter to the tubular case in a fixed state, in general, there has been conventionally employed a means for directly firmly attaching a thin outer peripheral edge portion of the diaphragm to an end surface portion around the opening on the one end of the tubular case in accordance with a Tig welding or the like.

However, in a case of employing the general means for welding the thin outer peripheral edge portion to the end surface portion of the tubular case so as to be firmly attached as mentioned above, the tubular case is hard to be molten and the diaphragm is easily molten due to a difference between a groove volume of the tubular case and a groove volume of the outer peripheral edge portion of the diaphragm which are to be welded and firmly attached to each other. Accordingly, a weld penetration of the welded position becomes uneven and a poor weld tends to be generated, so that a deterioration of a production yield ratio tends to be caused. Further, in the diaphragm having the small thickness, the outer peripheral edge portion is thermally molten rapidly and a weld heat makes progress toward a center portion of the diaphragm. However, since a progressing degree of the weld heat is not uniform in all the circumference of the diaphragm but is dispersed in a circumferential direction, a heat strain such as an annular crimp which does not have a shape similar to the outer peripheral edge portion is generated in an inner periphery of the weld outer peripheral edge portion, and a distortion displacing amount of the diaphragm is adversely affected by the heat strain. As a result, there is caused a problem that it is impossible to secure a predetermined pressure measuring precision.

The poor weld and the generation of the heat strain can be reduced to a certain level by an improvement of a welding skill, however, a deterioration of the yield ratio and an increase of a production cost are caused in the light of a production technique, and an accurate measuring precision cannot be secured at all.

Accordingly, there has been conventionally proposed a diaphragm in which radial or multiple concentric waves or crimps are previously and positively formed in a whole region of a center portion thereof by press molding the center portion except an outer peripheral edge portion, as a diaphragm of an electrostatic capacity type pressure gauge (for example, refer to Patent Document 1).

Patent Document 1: U.S. Pat. No. 4,434,203

DISCLOSURE OF THE INVENTION

Problem to be Solved by the Invention

In accordance with the diaphragm as shown in Patent Document 1 mentioned above, since a surface area of the radial or multiple concentric waves or the crimps formed in the center portion is sufficiently large, it is possible to efficiently radiate the weld heat making progress toward the center portion so as to hold back the progress at a time of welding the outer peripheral edge portion of the diaphragm to the end surface portion of the tubular case, thereby inhibiting the uneven heat strain from being generated in the circumferential direction. However, it is unavoidable that the poor weld is generated by the unevenness of the weld penetration of the welded position due to the difference of the groove volumes, as well as the reduction of the measuring precision caused thereby. In addition, there has been a problem that a manufacturing cost of a whole of the electrostatic capacity type pressure gauge becomes expensive, due to an increase of a complicated manufacturing man hour such as previously forming the radial or multiple concentric waves or the crimps in the diaphragm itself by the press molding or the like, and a deterioration of the yield ratio in which the improvement of the welding skill is essential.

The present invention is made by taking the actual conditions mentioned above into consideration, and an object thereof is to provide a diaphragm attaching structure of an electrostatic capacity type pressure gauge which can achieve an improvement of a measuring precision by inhibiting a poor weld and a heat strain from being generated while restricting an increase of a cost with an easy manufacturing.

Means for Solving the Problem

In order to achieve the object mentioned above, in accordance with the present invention, there is provided a diaphragm attaching structure of an electrostatic capacity type pressure gauge in which a diaphragm for receiving a fluid pressure is provided in a tensional manner on one end of a tubular case, and a fixed side electrode for picking up a deflection displacement of the diaphragm as a change of an electric capacity is provided within the tubular case on a side opposite to a pressure receiving surface of the diaphragm, wherein an outer peripheral edge portion of the diaphragm is formed thicker than a center portion thereof, and the thick outer peripheral edge portion is thermally molten to be welded and firmly attached to an end surface portion around the opening on the one end of the tubular case.

In this invention, it is preferable that the thick outer peripheral edge portion of the diaphragm is formed in a symmetrical shape back to front while setting a center of thickness of the diaphragm to a center of symmetry, and further, it is preferable that the outer peripheral edge portion of the diaphragm is formed with a thickness having a volume which is equal to or approximately equal to a groove volume of the tubular case to be welded.

Effect of the Invention

In accordance with the present invention employing the feature and the structure as mentioned above, it is possible to have a sufficient weld margin (a weld penetration margin) by making the outer peripheral edge portion of the diaphragm thicker, and it is possible to easily and securely weld without any mistake even under a low welding skill, by uniformly penetrating the outer peripheral portion. Further, it is possible to restrict as much as possible a generation of a heat strain caused by a progress of a weld heat toward a center portion of the diaphragm so as to secure a predetermined deflection displacing amount. Accordingly, it is possible to achieve an improvement of a pressure measuring precision. Further, in manufacturing the diaphragm, it is possible to easily manufacture the thin diaphragm in which only the outer peripheral edge portion is made thick, only by adding a masking step and an etching step. Therefore, since a manufacturing cost of the diaphragm is lowered, and it is possible to securely and easily weld without generating any poor weld and without necessity of a high welding skill, there can be obtained an effect that it is possible to obtain an electrostatic capacity type pressure gauge having a high measuring precision while restricting an increase of a whole manufacturing cost as much as possible.

Particularly, it is possible to make the penetrating amount of the welded position uniform and stable so as to manufacture the highly precise electrostatic capacity type pressure gauge having the stable deflection displacing amount with a good yield ratio by forming the outer peripheral edge portion of the diaphragm with the thickness having the volume equal to or approximately equal to the groove volume of the tubular case to be welded, thereby achieving a further reduction of the cost.

Figure 1:
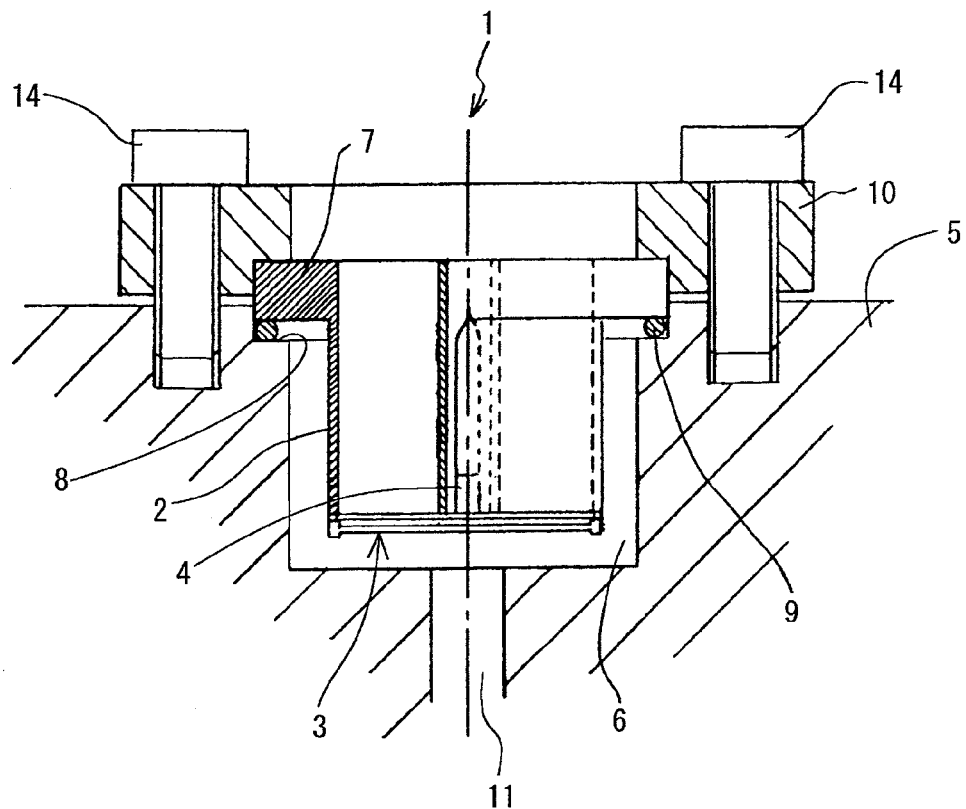
FIG. 1 is a cross sectional view showing an example of an electrostatic capacity type pressure gauge in accordance with the present invention.

DESCRIPTION OF SYMBOLS 1 electrostatic capacity type pressure gauge
2 cylindrical case
2e end surface portion around opening
3 diaphragm
3a thick outer peripheral edge portion
3b center portion
4 fixed side electrode
t thickness of center portion
t1 thickness of outer peripheral edge portion
sc. center of symmetry

BEST MODE FOR CARRYING OUT THE INVENTION

A description will be given below of embodiments in accordance with the present invention with reference to the drawings.

FIG. 1 is a cross sectional view showing one example of an electrostatic capacity type pressure gauge in accordance with the present invention. The electrostatic capacity type pressure gauge 1 is structured such that a diaphragm 3 for receiving a fluid pressure of a gas or the like is provided in a tensional manner on one end of a tubular case 2 made of a corrosion resisting material such as a stainless steel, and a fixed side electrode 4 for picking up a deflection displacement of the diaphragm 3 as a change of an electric capacity is provided in a center portion within the tubular case 2 on a side opposite to a pressure receiving surface of the diaphragm 3.

The electrostatic capacity type pressure gauge 1 is arranged to be inserted into a concave space 6 formed in a pressure gauge attaching block 5 in such a manner that the diaphragm 3 opposes to a fluid pressure detecting port 11, and is fastened and fixed to a pressure gauge attaching block 5 in a state where a seal ring 9 such as a metal gasket is interposed between an annular flange portion 7 integrally formed on the other end side of the cylindrical case 2 so as to protrude to an outer side, and an annular step portion 8 formed in a peripheral portion on an opening end side of the concave space 6, and the annular flange portion 7 is pressed to the annular step portion 8 via an annular pressing member 10 and a fastening bolt 14.

Further, in such a used aspect mentioned above, when a fluid pressure of the fluid pressure detecting port 11 is applied to the diaphragm 3 and the diaphragm 3 is displaced in a deflecting manner in proportion to the fluid pressure, a deflection displacing amount thereof is picked up as a change of an electric capacity from the fixed side electrode 4, and is processed by an electric circuit provided independently from the electrostatic capacity type pressure gauge 1, whereby the fluid pressure of the gas or the like is measured.

Figure 2:
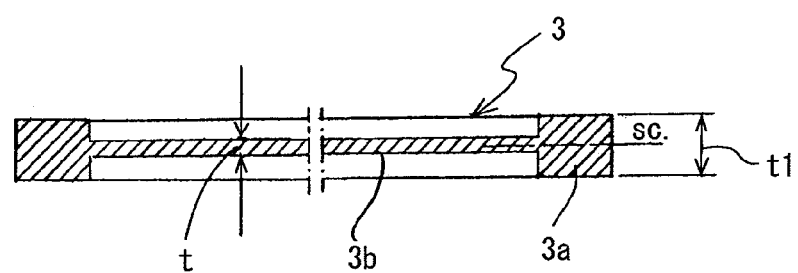
FIG. 2 is an enlarged vertical cross sectional view of a diaphragm of the electrostatic capacity type pressure gauge.
Figure 3:
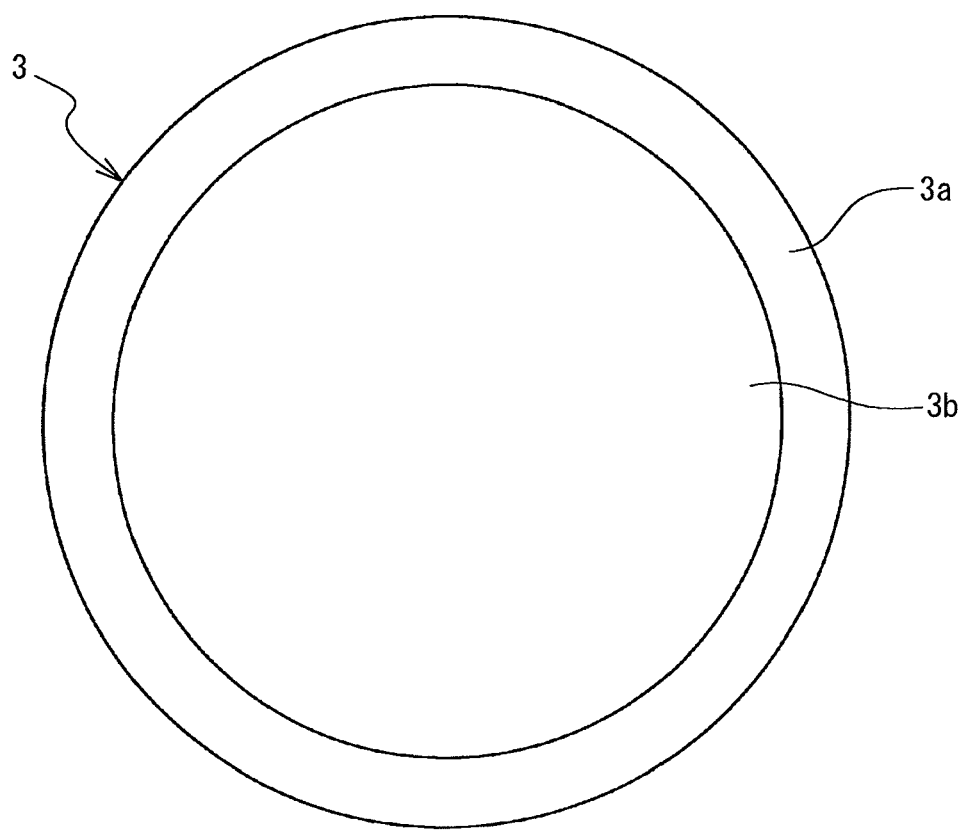
FIG. 3 is a plan view of the diaphragm.

The diaphragm 3 in the electrostatic capacity type pressure gauge 1 structured as mentioned above and used as mentioned above is formed such that an outer peripheral edge portion 3a thereof is formed thicker than a center portion 3b. Specifically, as shown in FIGS. 2 and 3, a thickness t of the center portion 3b is formed uniformly in a range between 25 and 125 μm, however, the outer peripheral edge portion 3a is formed in a symmetric shape back to front while setting a center of the thickness t of the center portion 3b as a center sc. of symmetry so as to have a whole thickness t1 of about 500 μm.

Figure 4:
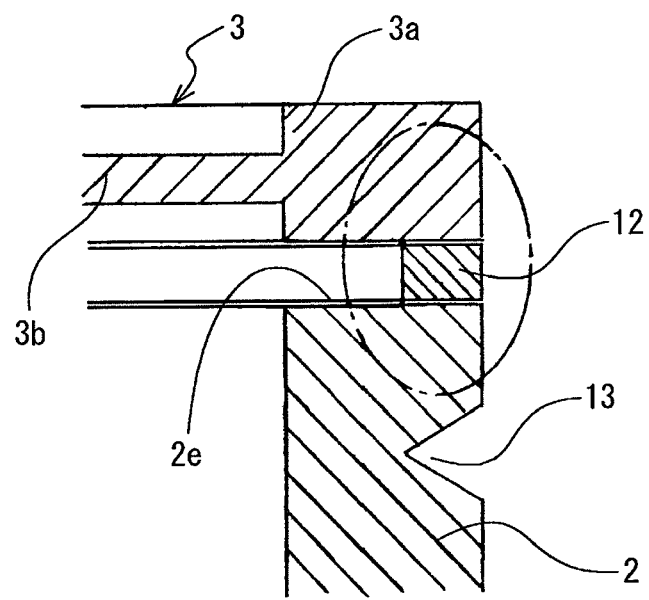
FIG. 4 is an enlarged cross sectional view of a main portion showing a weld state of an outer peripheral edge portion of the diaphragm.

As shown in FIG. 4, the diaphragm 3 thus formed is firmly attached to an end surface portion 2e around an opening on one end of the cylindrical case 2 by pressing the outer peripheral edge portion 3a to the end surface portion 2e around the opening on the one end of the cylindrical case 2 via an annular intermediate weld member 12, and in this state, Tig welding in such a manner as to thermally melt a whole periphery of a region surrounded by a single-dot chain line in FIG. 4.

At this time, since the outer peripheral edge portion 3a of the diaphragm 3 is formed with the thickness having the sufficient penetrating margin, it is possible to stably secure the uniform weld penetrating amount all around the periphery of the welded position. Accordingly, the weld heat hardly makes progress toward the thin center portion 3b so as to suppress generation of the heat strain as well as it is possible to securely and easily weld and firmly attach without generating any poor weld. Therefore, it is possible to secure a predetermined deflection displacing amount of the center portion 3b so as to achieve an improvement of the pressure measuring precision.

In particular, it is preferable to form the outer peripheral edge portion 3a of the diaphragm 3 with such a thickness having a volume which is equal to or approximately equal to a groove volume of the portion on the one end side rather than a V-shaped recess 13 provided in an outer peripheral surface portion near the end surface portion 2e around the opening on the one end of the cylindrical case 2 to be welded, as shown in FIG. 4. In this case, since the weld penetrations of the weld portions in the outer peripheral edge portion 3a of the diaphragm 3 and the outer end surface portion 2e of the cylindrical case 2 become uniform, and the weld penetrating amount is stabilized over a whole periphery, generation of the heat strain is further lowered, and it is possible to achieve a further improvement of the pressure measuring precision.

Further, thickening of the outer peripheral edge portion 3a of the diaphragm 3 can be achieved only by adding a masking step and an etching step to a general manufacturing of extracting a plurality of diaphragms 3 from a large thin plate member by masking and etching, and it is easy to manufacture in comparison with the diaphragm shown in Patent Document 1 mentioned above, and it is possible to achieve a reduction of a manufacturing cost.

Figure 5:
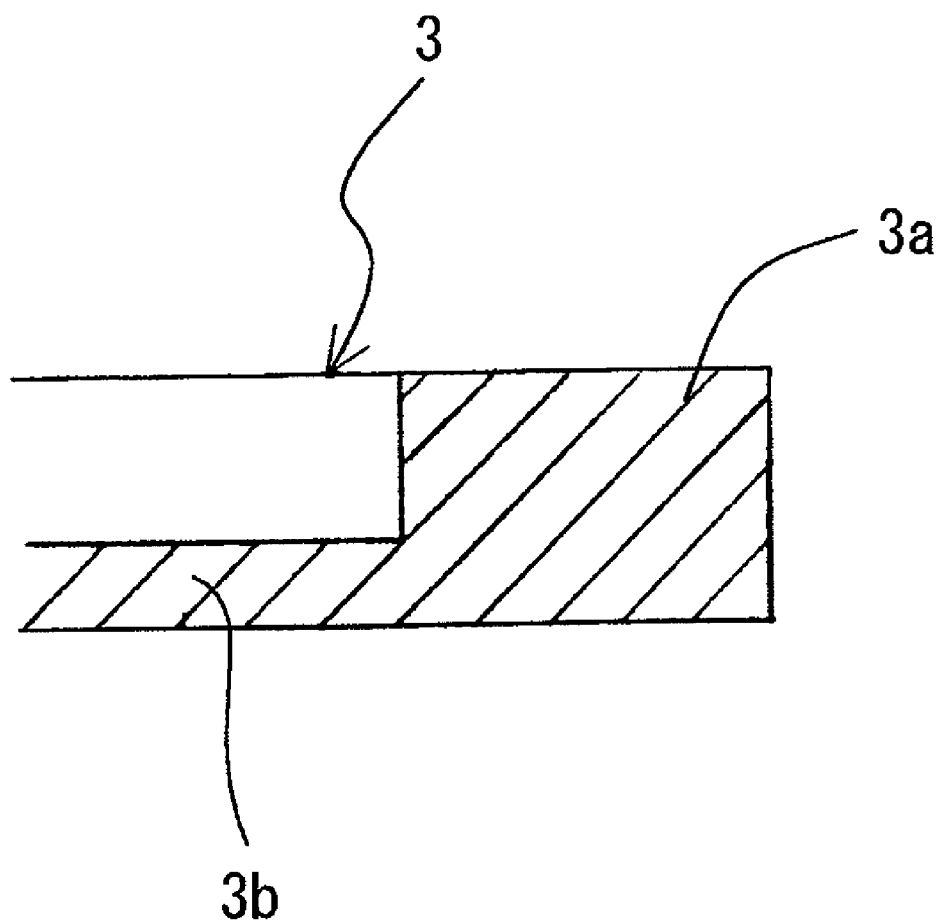
FIG. 5 is an enlarged cross sectional view of a main portion showing another example of the outer peripheral edge portion of the diaphragm of the electrostatic capacity type pressure gauge.

In the embodiment mentioned above, the outer peripheral edge portion 3a of the diaphragm 3 is formed in the symmetrical shape back to front while setting the center of the thickness t of the center portion 3b to the center sc. of the symmetry, but may be formed in an asymmetrical shape in which the thickness is increased only to one of the front and back sides of the center portion 3b, as shown in FIG. 5.

INDUSTRIAL APPLICABILITY

Since the diaphragm attaching structure of the electrostatic capacity type pressure gauge in accordance with the present invention can suppress generation of the poor weld and the heat strain so as to achieve the improvement of the measuring precision, while being easily manufactured and suppressing the increase of the cost, the diaphragm attaching structure can be applied to an electrostatic capacity type pressure gauge, such as a pressure gauge used as a mass flow sensor in a mass flow controller, in which a diaphragm for receiving a fluid pressure is provided in a tensional manner on an opening side on one end of a tubular case, and a fixed side electrode for picking up a deflecting displacement of the diaphragm as a change of an electric capacity is provided within the tubular case on a side opposite to a pressure receiving surface of the diaphragm.

The invention claimed is:

1. A diaphragm attaching structure of an electrostatic capacity type pressure gauge, in which a metal diaphragm for receiving a fluid pressure is provided in a tensional manner on one end of a metal tubular case, and a fixed side electrode for picking up a deflection displacement of the diaphragm as a change of an electric capacity is provided within the tubular case on a side opposite to a pressure receiving surface of the diaphragm, wherein an outer peripheral edge portion of the diaphragm is annular and formed thicker than a center portion thereof, and the thick outer peripheral edge portion and adjacent one end of the metal tubular case is thermally molten to form a weldment to firmly attached an end surface portion around the opening on the one end of the tubular case to the diaphragm.

2. The diaphragm attaching structure of an electrostatic capacity type pressure gauge according to claim 1, wherein the thick outer peripheral edge portion of the diaphragm is formed in a symmetrical shape back to front while setting a center of thickness of the diaphragm to a center of symmetry.

3. The diaphragm attaching structure of an electrostatic capacity type pressure gauge according to claim 1, wherein the outer peripheral edge portion of the diaphragm is formed with a thickness having a volume which is equal to or approximately equal to a volume of the portion on the one end side rather than a recess provided in an outer peripheral surface portion around the opening on the one end of the tubular case to be welded.

4. The diaphragm attaching structure of an electrostatic capacity type pressure gauge according to claim 2, wherein the outer peripheral edge portion of the diaphragm is formed with a thickness having a volume which is equal to or approximately equal to a volume of the portion on the one end side rather than a recess provided in an outer peripheral surface portion around the opening on the one end of the tubular case to be welded.

5. In an electrostatic capacity pressure gauge, having a hollow metal casing for operative attachment to a source of fluid, the improvement comprising:
a one piece metal diaphragm having a planar central portion that is pressure displaceable by the fluid and an annular outer peripheral edge portion that is thicker than the central portion thickness and is integrally mounted by weldment to the hollow metal casing to seal one end of the metal hollow casing.

6. The electrostatic capacity pressure gauge of claim 5 wherein the outer peripheral edge portion is formed in a cross-sectional symmetrical shape with the central portion integrally extending from and around an inner intermediate position of the symmetrical shape of the outer peripheral edge portion.

7. The electrostatic capacity pressure gauge of claim 6 where the outer peripheral edge portion width is equal to a thickness of one end of the hollow metal casing.

8. The electrostatic capacity pressure gauge of claim 7 wherein the center portion thickness is between 25 μm and 125 μm.

9. The electrostatic capacity pressure gauge of claim 8 wherein the thickness of the outer peripheral edge portion is approximately 500 μm.

10. In an electrostatic capacity pressure gauge for measuring a fluid pressure having a hollow method casing with a fixed electrode mounted in the hollow mold casing and a metal diaphragm secured to the hollow metal casing so that one side of the metal diaphragm is adjacent the fixed electrode and the other side of the metal diaphragm is in contact with the fluid and subject to a deflectional displacement by the fluid pressure which the fixed electrode can perk up as a change of an electric capacity representative of the fluid pressure, the improvement comprising:
a one piece metal diaphragm having parallel planar surface across a central portion that is pressure displaceable by the fluid and an integral annular outer metal peripheral edge portion that has a thin film that is multiple times the central portion thickness, the central portion thickness is within a range of 25 μm to 125 μm and the metal of the annular outer metal peripheral edge portion is compatible with the hollow metal casing to be integrally mounted by a weldment to the hollow metal casing to seal one end of the metal hollow casing.

11. The electrostatic capacity pressure gauge of claim 10 wherein the outer peripheral edge portion is formed in a cross-sectional symmetrical shape with the central portion integrally extending from and around an inner intermediate position of the symmetrical shape of the outer peripheral edge portion.

12. The electrostatic capacity pressure gauge of claim 11 where the outer peripheral edge portion width is equal to a thickness of one end of the hollow metal casing.

13. The electrostatic capacity pressure gauge of claim 12 wherein the thickness of the outer peripheral edge portion is approximately 500 μm.

14. The electrostatic capacity pressure gauge according to claim 10, wherein the thick outer peripheral edge portion of the diaphragm is formed in a symmetrical shape back to front while setting a center of thickness of the diaphragm to a center of symmetry.

15. The electrostatic capacity pressure gauge according to claim 10 where the metal diaphragm is stainless steel.

* * * * *